(12) United States Patent
Leon

(10) Patent No.: US 6,644,299 B1
(45) Date of Patent: Nov. 11, 2003

(54) COVERED GRILL APPARATUS

(76) Inventor: Randy A. Leon, 168 W. Elm St., Phoenix, AZ (US) 85013

( * ) Notice: Subject to any disclaimer, the term of this patent is extended or adjusted under 35 U.S.C. 154(b) by 0 days.

(21) Appl. No.: 10/300,081

(22) Filed: Nov. 21, 2002

(51) Int. Cl.[7] ............................................. F24C 3/08
(52) U.S. Cl. ..................... 126/25 R; 126/41 R; 126/276
(58) Field of Search ............................. 126/25 R, 41 R, 126/276; D7/332, 333

(56) References Cited

U.S. PATENT DOCUMENTS

| | | | |
|---|---|---|---|
| D292,547 S | * | 11/1987 | Bayer |
| D366,804 S | * | 2/1996 | Kitten |
| 5,676,045 A | * | 10/1997 | Faraj ............................ 99/339 |
| D395,982 S | * | 7/1998 | Dunn |
| D429,944 S | * | 8/2000 | Alle |
| D436,284 S | * | 1/2001 | Mak |
| 6,298,774 B1 | * | 10/2001 | Latham et al. ................. 99/340 |

OTHER PUBLICATIONS

Snapshots of the last scenes from the major motion picture "Gone in 60 Seconds", 2000.*

* cited by examiner

Primary Examiner—Alfred Basichas
(74) Attorney, Agent, or Firm—H. Gordon Shields

(57) ABSTRACT

Cooking grill apparatus includes a portion of a vehicle, such as a front portion or a rear portion, for decorative and functional purposes, disposed in or on a free standing grill assembly or base. A vehicle engine hood or, in an alternate embodiment, a vehicle trunk lid, comprises a cover for a cooking grill disposed on the base. Adjacent portions of the vehicle are included for protective, functional, and decorative applications. The vehicle portion are integrated into the outdoor free standing grill assembly or base. The assembly or base may extend both laterally and rearwardly from the vehicle portion. Vehicle lights may be used for nighttime use of the grill apparatus.

14 Claims, 3 Drawing Sheets

COVERED GRILL APPARATUS

BACKGROUND OF THE INVENTION

1. Field of the Invention

This invention relates to grills, and more particularly, to covered cooking grills, such as appropriate for outdoor use.

2. Description of the Prior Art

Outdoor cooking grills are typically either free standing or portable, and use either propane or charcoal for cooking. For cooking portable grills, there are wheeled units or hand carried units. Free standing grills are typically set in masonry of some type, such as brick or concrete blocks. Wheeled units typically include a cover, while hand carried units are typically placed in a covered storage location after use. Free standing units generally include a metal cover for the cooking area of the grill. However, such units may be subject to windblown debris damage and even to rain and snow damage.

The apparatus of the present invention provides a functional and a decorative cover for a free standing outdoor grill. The cover opens to provide direct access to the cooking area and closes to provide relatively complete protection from windblown debris and rain and snow.

SUMMARY OF THE INVENTION

The invention described and claimed herein comprises an outdoor freestanding grill assembly having an automotive vehicle portion, either a front end, including the engine hood, or an automotive rear end, including a trunk lid, enclosing the cooking area of the grill assembly. Front end and rear end fenders and bumpers may also be included in the grill assembly to provide both protective and decorative elements.

Among the objects of the present invention are the following:

To provide new and useful grill apparatus;

To provide new and useful outdoor freestanding grill apparatus;

To provide new and useful grill apparatus including an automotive front end;

To provide new and useful outdoor grill apparatus including a cooking area covered by a portion of an automotive front end;

To provide new and useful outdoor grill apparatus including a cooking area covered by covered by a portion of an automotive rear end;

To provide new and useful grill apparatus having a portion of a vehicle for a covering; and To provide new and useful decorative and functional vehicle elements for a grill.

DESCRIPTION OF THE PREFERRED EMBODIMENT

Figure 1:
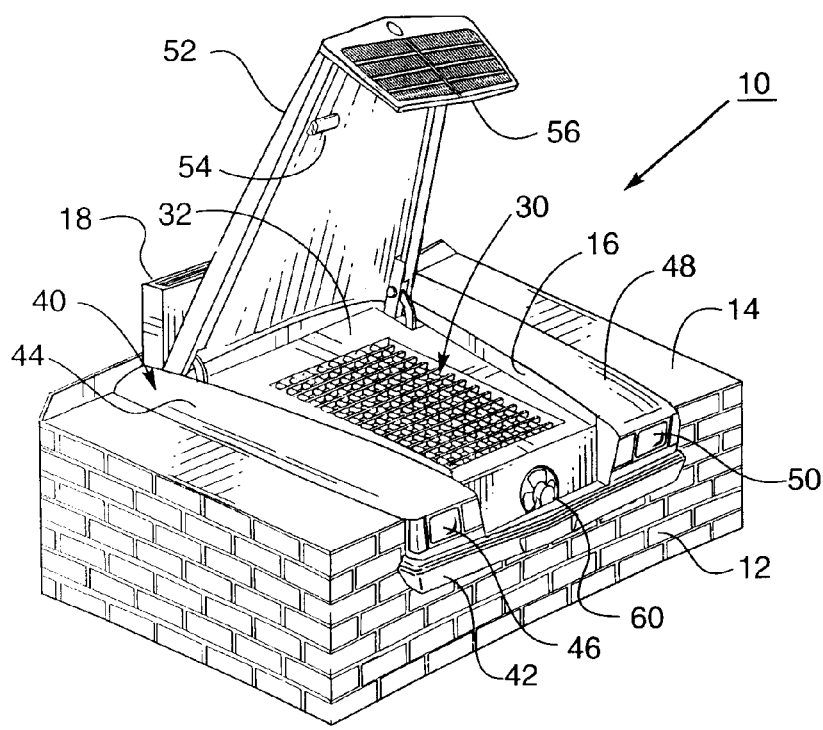
FIG. 1 is a perspective view of the apparatus of the present invention.
Figure 2:
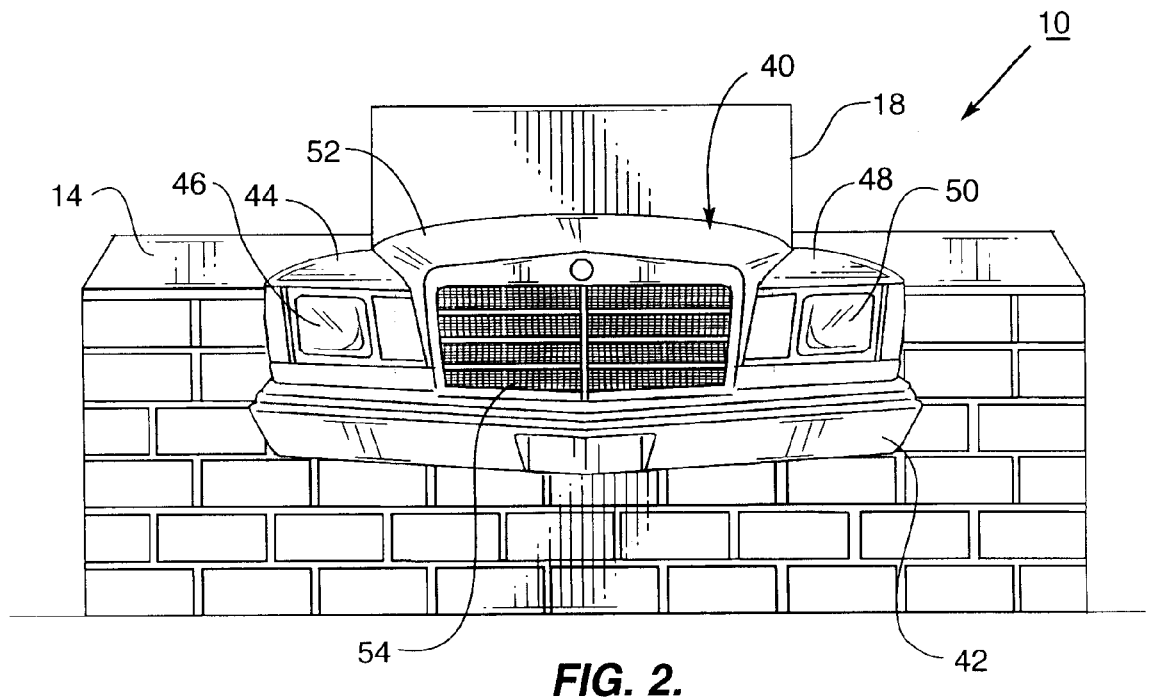
FIG. 2 is a front view of the apparatus of FIG. 1.

FIG. 1 is a front perspective view of outdoor grill apparatus 10 of the present invention in its operative configuration. FIG. 2 is a front view of the apparatus 10. For the following discussion, reference may be made to both FIGS. 1 and 2.

It will be noted that two different "grill" elements are involved in the present invention, a vehicle front end grill, and a cooking grill. The different "grills" will generally be referred to as either vehicle or cooking in order to avoid confusion.

The cooking grill apparatus 10 includes a base 12, and the base 12 includes a top 14. Generally centered on the top 14 is a recess 16, and disposed within the recess 16 is a cooking grill assembly 30. There are several types of cooking grill assemblies in use, such as charcoal, propane, natural gas, and perhaps others. Any desired or appropriate cooking grill assembly or unit may be used for the assembly 30.

For some grill assemblies, a chimney assembly 18 may be required or may be advantageous. The chimney assembly 18, of course, directly communicates with the cooking grill assembly 30.

Disposed about the recessed cooking grill assembly 30 is a vehicle front end assembly 40. The vehicle front end assembly 40 includes a front bumper 42, a right front fender 44 with its right front headlight 46, and a left front fender 48 with its left front headlight 50. A hood 52 pivots on the grill base 12 rearwardly of the cooking grill assembly 30. Secured to the hood 52 is a vehicle front grill 56. The particular vehicle illustrated has the vehicle grill 56 secured to the hood 52. However, very few contemporary vehicles have such a physical arrangement. In most cases the vehicle hood pivots, and the vehicle grill is separate from the hood and remains fixed with the front bumper and adjacent vehicle elements. However, the use of one type of vehicle or other is immaterial with respect to the present invention. For practical purposes, the pivoting of the hood is paramount.

For access to the cooking grill assembly 30, the hood 52 is pivoted upwardly, as shown in FIG. 1. With the front bumper 42 and the adjacent fender and headlight assemblies 44, 46 and 48, 50 remaining fixed in the base 12, the cooking grill assembly 30 is conveniently accessible. Note that only a portion of the vehicle front end 40 is displayed. And none of the vehicle front end elements causes any physical inconvenience in accessing the cooking grill assembly 30. Moreover, the fact that the illustrated vehicle grill 56 is secured to the hood 52 and pivots therewith, is immaterial. That is, the presence of the vehicle grill 56 on the hood 52 does not restrict access to the cooking grill assembly 30.

For providing illumination for the cooking grill assembly 30 there is a light fixture 54 secured to the underside of the hood 52. Moreover, for providing illumination at night in the general area of the base 12 and the cooking grill assembly 30, the vehicle headlights 46 and 50 may be connected to an appropriate electrical power source and switch, along with a switch and electrical power source for the light fixture 54. Such power source and switches are, of course, well known and understood.

A generally flat grill plate 32 is disposed about the cooking grill assembly 30. The grill plate 32 extends laterally to the generally vertically extending walls of the recess 16. The size and configuration of the plate 32 may be as appropriate or as desired, but generally conforms to the area within the fender portion of the vehicle front end 40, and forwardly of the rear of the base 12. The wall areas defining the recess 16 are generally the inside walls of the fenders 44 and 48 and the adjacent rear wall of the base 12.

At the front of the apparatus 10 and at the front of the vehicle front end 40, is a fan 60. The fan 60 is located in the general vicinity of where a radiator fan is located in a vehicle. However, in place of a radiator, the purpose of the fan 60 is to provide air flow for the cooking grill assembly 30. Again, no electrical power source or switch for the fan 60 are illustrated.

When cooking on the cooking grill assembly 30 is finished, the hood 52 is pivoted downwardly, or "closed" in the vehicle vernacular, to cover the cooking grill assembly 30.

In addition to being decorative, the vehicle front end assembly 40 thus provides a functional aspect as well. The presence of the hood 52 provides a protective cover for the cooking grill assembly 30. Moreover, the curvature of the adjacent front fenders provides a natural runoff path for rain, etc.

Figure 3:
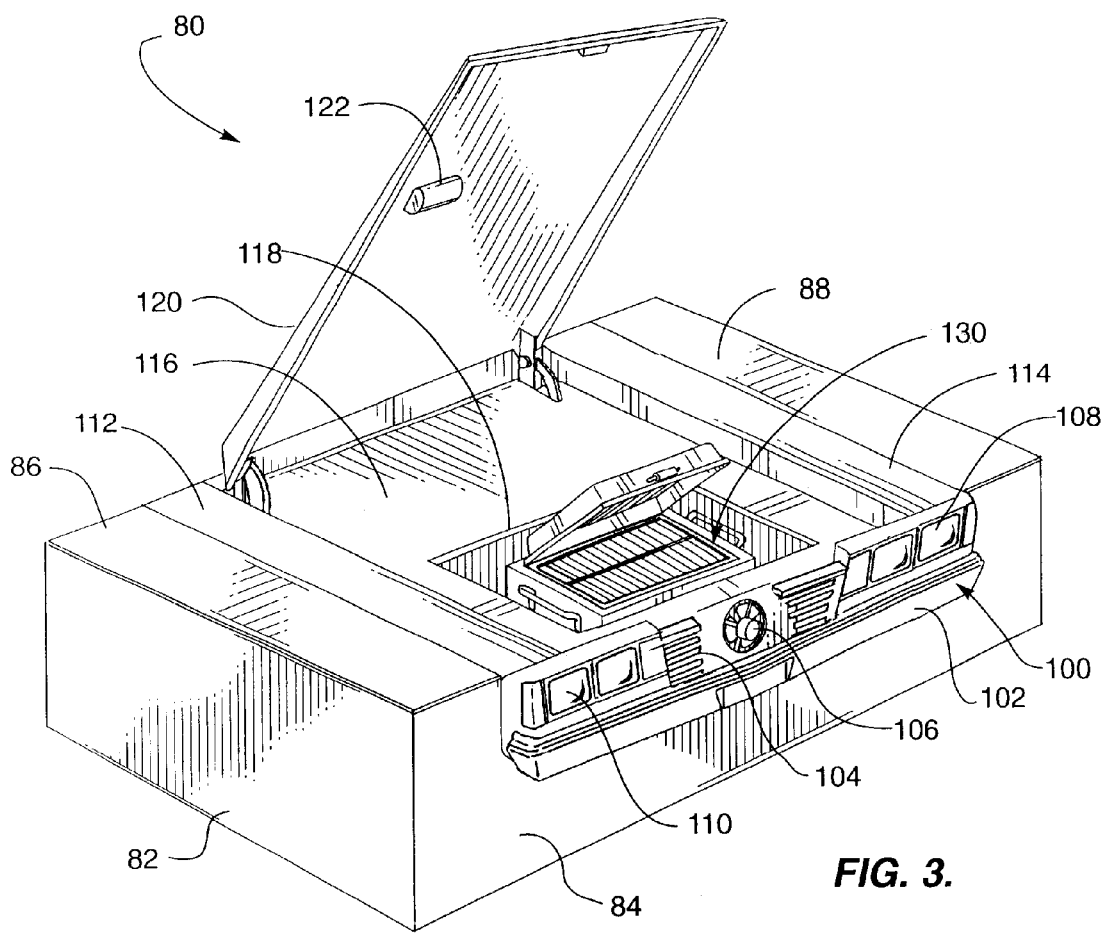
FIG. 3 is perspective view of an alternate embodiment of the present invention.

FIG. 3 is a perspective view of an alternate embodiment 80 of the apparatus of the present invention illustrated in FIGS. 1 and 2. The grill apparatus 80 includes the front end of a vehicle in an environment slightly different from the embodiment of FIGS. 1 and 2. The apparatus 80 includes a base 82 which may be made of appropriate material and has an appropriate or desired overall design configuration. The base 82 includes a front end 84 and pair of generally flat top portions 86 and 88.

A vehicle front end assembly 100 is disposed in the base 82. The vehicle front end assembly 100 includes a front bumper 102 and centered above the bumper 102 is a vehicle grill 104. The vehicle grill 104 is broken away to reveal a fan 106. Adjacent to the vehicle grill 104 are front headlight assemblies 108 and 110. The headlight assemblies 108 and 110 may be dual headlights or single headlights, as appropriate or according to the particular vehicle front end assembly 100 being used. The headlight assemblies 108 and 110 may be appropriately connected to an electrical power source and a switch or switches for selectively providing illumination for nighttime use of the apparatus 80.

The front end assembly includes fenders 112 and 114. The fenders 112 and 114 extend from the base top portions 86 and 88, respectively. Inwardly from the fenders 112 and 114 is a generally flat plate 116. A cooking grill recess 118 extends downwardly into the base 82 from the front portion of the plate 116. The plate 116 extends from rearwardly of the recess and generally to the front portion of the vehicle assembly 100 and adjacent to the headlight assemblies 108 and 110, as desired or as appropriate.

The vehicle front end 100 also includes a hood 120 which is appropriately pivoted adjacent to the rear of the base 82. Secured to the underneath portion of the hood 120 is a light assembly 122. The light assembly 122 provides illumination for nighttime use of the apparatus 80, as desired, and when connected to an appropriate electrical power source and switch.

A cooking grill assembly or unit 130 is disposed in the recess 118, and access to the cooking grill assembly is provided when the hood 120 is pivoted upwardly, as shown When the hood 120 is pivoted downwardly to its closed position, the cooking grill 130 and the area disposed about the cooking grill assembly, is protected by the hood. The cooking grill assembly 130 may be a portable unit, as opposed to the generally fixed cooking grill assembly 30 of FIG. 1. The portable cooking grill assembly 130 may be as desired, propane, charcoal, etc. The unit 130 maybe a smoker unit, with a top lid, as shown. For a portable grill assembly, an appropriate heat source must be provided, and such heat source may be propane, either from a small bottle, or from a large bottle located within or adjacent to the base 82, as desired, or charcoal, etc., as desired. Obviously, the recess 118 may be as large as required to accommodate whatever type of cooking grill assembly desired.

The flat plate 116 adjacent to the recess 118 and the cooking grill assembly 130 provides storage space for desired cooking accessories, such as tools, spices, etc. Again, the hood 120 in its down or closed position provides a cover for the cooking grill apparatus 130, as discussed above for the hood 52 of the apparatus 10. The base 82 extends laterally outwardly from the vehicle front end assembly 100, and the top portions 86 and 88 may be as large as desired to provide more storage space, areas for plates, etc.

Electrical elements involved in the present invention, such as a power source, conductors and, switches, as stated above, are well known and understood and are accordingly not illustrated or discussed in detail herein.

Figure 4:
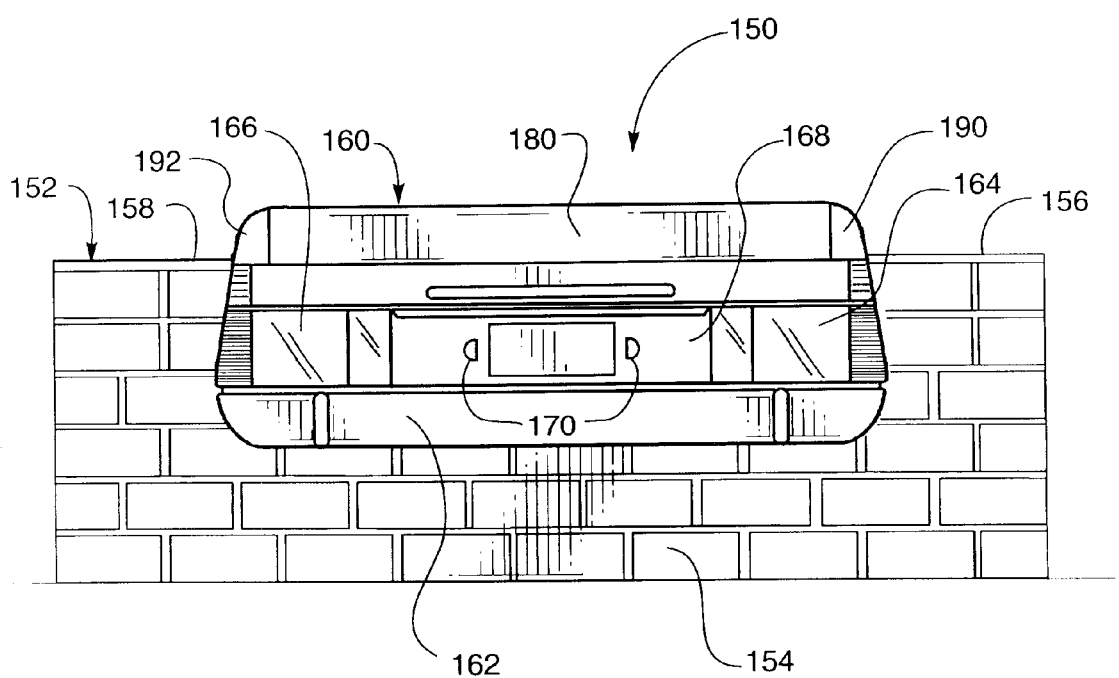
FIG. 4 is a front view of another alternate embodiment of the apparatus of the present invention.

FIG. 4 is a front perspective view of another alternate embodiment of the apparatus of the present invention, namely a cooking grill apparatus 150. The apparatus 150 includes a base 152, and the base 152 includes a front 154, a pair of sides, a back, and a pair of top surfaces 156 and 158. Disposed on or in the base is an automotive rear end 160. The rear end 160 functions in substantially the same way as do the automotive front end assemblies 40 and 100 of FIGS. 1, 2, and 3, discussed above.

The automotive rear end 160 includes a rear bumper 162, a right rear taillight assembly 164 and a left rear taillight assembly 166. The taillight assemblies may typically include taillights, brake lights, turn signal lights, and backup lights. The lights, especially the backup lights, may be used to provide some degree of illumination at night. Turn signal lights are typically amber, and those lights may help to negate insect attraction to ordinary, white light. Obviously, appropriate electrical circuitry and switches are required to control the various lights in the taillight assemblies.

Between the taillight assemblies 164 and 166 is a generally flat portion 168. The flat portion 168 includes a license plate holder, with a pair of lamps 170 to illuminate the license plate when the vehicle lights are turned on. Again, appropriate circuitry, including switches, is required for controlling the license plate lights.

A pivoting rear trunk lid 180 is shown in its down or closed position, covering a cooking grill area such as illustrated in FIGS. 1 or 3. It will be understood that the portion of the cooking grill area covered by the trunk lid 180 may be as desired. A light, similar to the lamps or lights 54 of the hood 52 and 122 of the hood 120, may be secured to the underneath portion of the trunk lid 180 for illuminating the cooking grill beneath the trunk lid. If desired, of course, all such lights may be in whatever number and location as may provide the best illumination arrangement for a particular structural situation.

A pair of rear fenders 190 and 192 are shown extending rearwardly from the taillight assemblies and disposed on opposite sides of the trunk lid 180. Inwardly from the fenders 190 and 192, and downwardly beneath the trunk lid 180, is a flat portion, as illustrated above in FIGS. 1 and 3, with a recess for a cooking grill, also as illustrated, and as desired for a particular grill assembly.

When the trunk lid 180 is in its down position, as shown, it provides protection for the cooking grill disposed beneath it, just as do the front hoods of FIGS. 1, 2, and 3. The other vehicular elements also provide essentially the same function as the vehicular elements of the embodiments of FIGS. 1, 2, and 3. When the trunk lid 180 is pivoted upwardly, access is provided to the cooking grill disposed beneath the trunk lid and disposed on or in the base, as shown above for the embodiments of FIGS. 1, 2, and 3.

While the principles of the invention have been made clear in illustrative embodiments, without departing from those principles there may occur to those skilled in the art modifications of structure, arrangement, proportions, the elements, materials, and components used in the practice of the invention, and otherwise, which are particularly adapted to specific environments and operative requirements. The appended claims are intended to cover and embrace any and all such modifications within the limits only of the true spirit and scope of the invention.

What is claim is:

1. Grill apparatus comprising in combination:
    a base member for supporting a cooking grill and extending outwardly from the cooking grill, wherein the base member further includes a top and a recess in the top;
    at least a portion of a vehicle disposed in the recess of the base member, wherein the at least a portion of a vehicle further includes a cooking grill and an element pivotally disposed over the cooking grill for providing a cover for the cooking grill.
2. The grill apparatus of claim 1 in which the pivotally disposed element is a vehicle hood which pivots between a down position covering the cooking grill and an open position for providing access to the cooking grill by a user.
3. The grill apparatus of claim 2 in which the vehicle portion further includes vehicle fenders disposed adjacent to the vehicle hood.
4. The grill apparatus of claim 1 in which the vehicle portion further includes lights for providing illumination for nighttime use of the grill apparatus.
5. The grill apparatus of claim 4 in which the vehicle portion further includes fenders adjacent to the hood, and the lights include headlights disposed in the fenders.
6. The grill apparatus of claim 4 in which the lights include a light secured to the hood for providing illumination for the cooking grill assembly.
7. The grill apparatus of claim 1 in which the vehicle portion further includes a fan.
8. The grill apparatus of claim 7 in which the vehicle portion further includes a vehicle grill disposed adjacent to the fan.
9. The grill apparatus of claim 1 in which the vehicle portion further includes a front bumper.
10. The grill apparatus of claim 9 in which the vehicle portion further includes a fan disposed adjacent to the front bumper.
11. The grill apparatus of claim 10 in which the vehicle portion further includes a vehicle grill disposed adjacent to the fan.
12. The grill apparatus of claim 1 in which the pivotally disposed element is a vehicle trunk lid.
13. The grill apparatus of claim 12 in which the vehicle portion further includes a rear bumper.
14. The grill apparatus of claim 12 in which the vehicle portion further includes a taillight assembly.

* * * * *